July 19, 1932.   A. L. C. RINGEL   1,868,433
RADIODIAL OR STATION SELECTOR
Filed Jan. 10, 1931   2 Sheets-Sheet 1

Albert L.C. Ringel
INVENTOR
BY Victor J. Evans
and A. L. Evans
ATTORNEYS

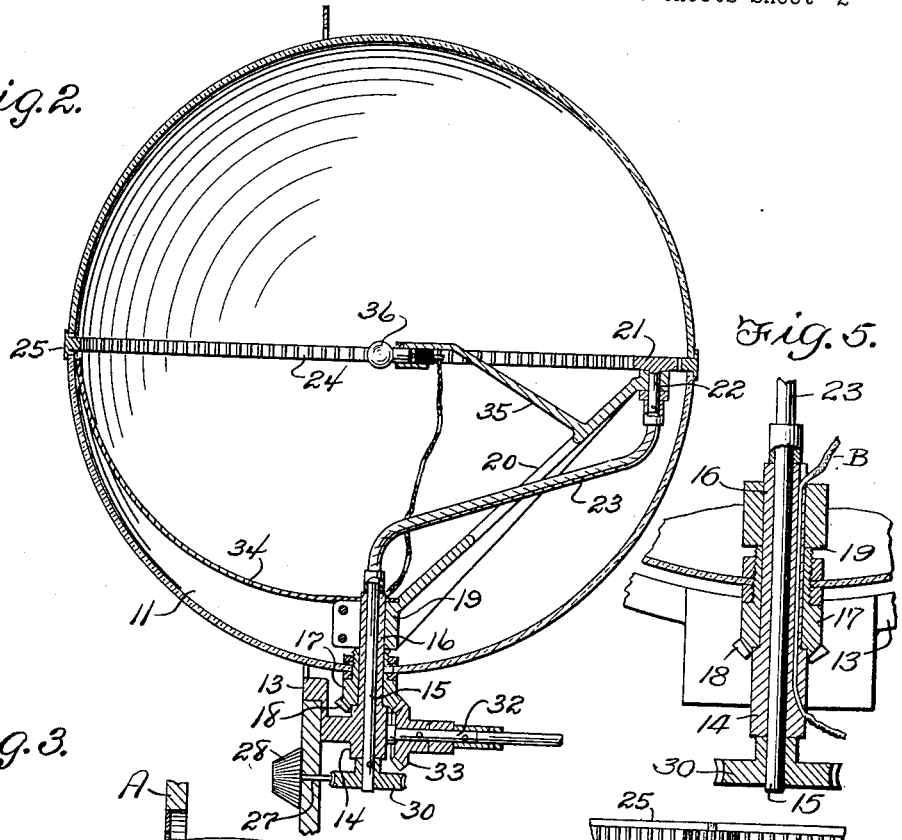
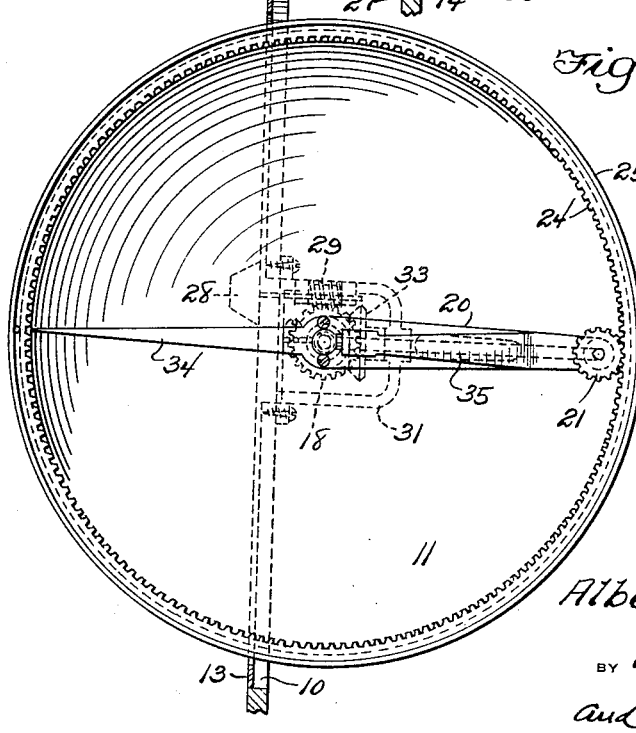
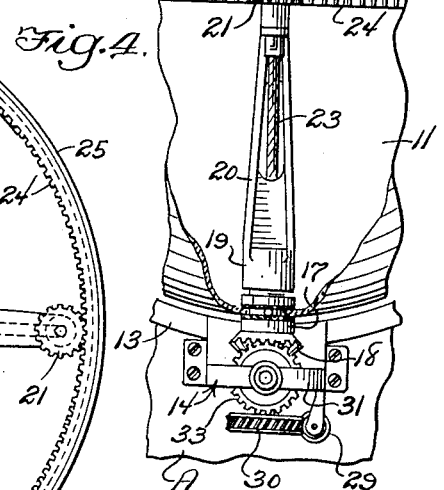

Patented July 19, 1932                                                    1,868,433

UNITED STATES PATENT OFFICE

ALBERT L. C. RINGEL, OF ALTOONA, PENNSYLVANIA

RADIODIAL OR STATION SELECTOR

Application filed January 10, 1931. Serial No. 507,928.

The invention relates to a dial construction for use with radio receiving sets and more especially to tuning dials or station selectors for radios.

The primary object of the invention is the provision of a dial or selector of this character, wherein the same simulates the globe of the world having external mapped surface indicative of the hemispheres throughout the universe and has in association therewith a scale or demarcation, the same in the layout thereof being congruous with localities of the world having broadcasting stations, whereby on adjustment of the dial, the scale of demarcations, at a glance will enable the user of a radio receiving set to select with accuracy the particular broadcasting station, while the map of the world will enable one to visualize the location of such station.

Another object of the invention is the provision of a dial or selector of this character, wherein the globe indicative of the map of the world can be located within a radio receiving set or externally supported relative thereto and its make-up is novel in form and most attractive and neat in appearance.

A further object of the invention is the provision of a dial or selector of this character, wherein the construction thereof permits the radio receiving set to be adjusted for tuning purposes with accuracy and such dial, for a maximum area, will be illuminated to permit clear vision of both its scale and the map indicative of the world.

A still further object of the invention is the provision of a dial or selector of this character which is extremely simple in construction, thoroughly reliable and efficient in its purposes, neat and attractive in appearance, readily and easily adjusted to finely vary the capacity of a condenser or like instrument within a radio receiving set and which is so constructed that an extremely large logging chart is provided to permit numerous stations to be easily and accurately logged.

With the above and other objects in view, the invention consists in the features of construction, combination and arrangement of parts, as will be hereinafter more fully described in detail, illustrated in the accompanying drawings which disclose the preferred embodiment of the invention, and pointed out in the claims hereunto appended.

In the accompanying drawings:—

Figure 2 is a fragmentary vertical sectional view taken on the line 2—2 of Figure 1, looking in the direction of the arrows.

Figure 3 is a horizontal transverse sectional view through the dial.

Figure 4 is a fragmentary view, wth parts broken away.

Figure 5 is a detail sectional view showing the electric connection to the lamp bulb and leading without the translucent sphere or globe.

Similar reference characters indicate corresponding parts throughout the several views in the drawings.

Figure 1:
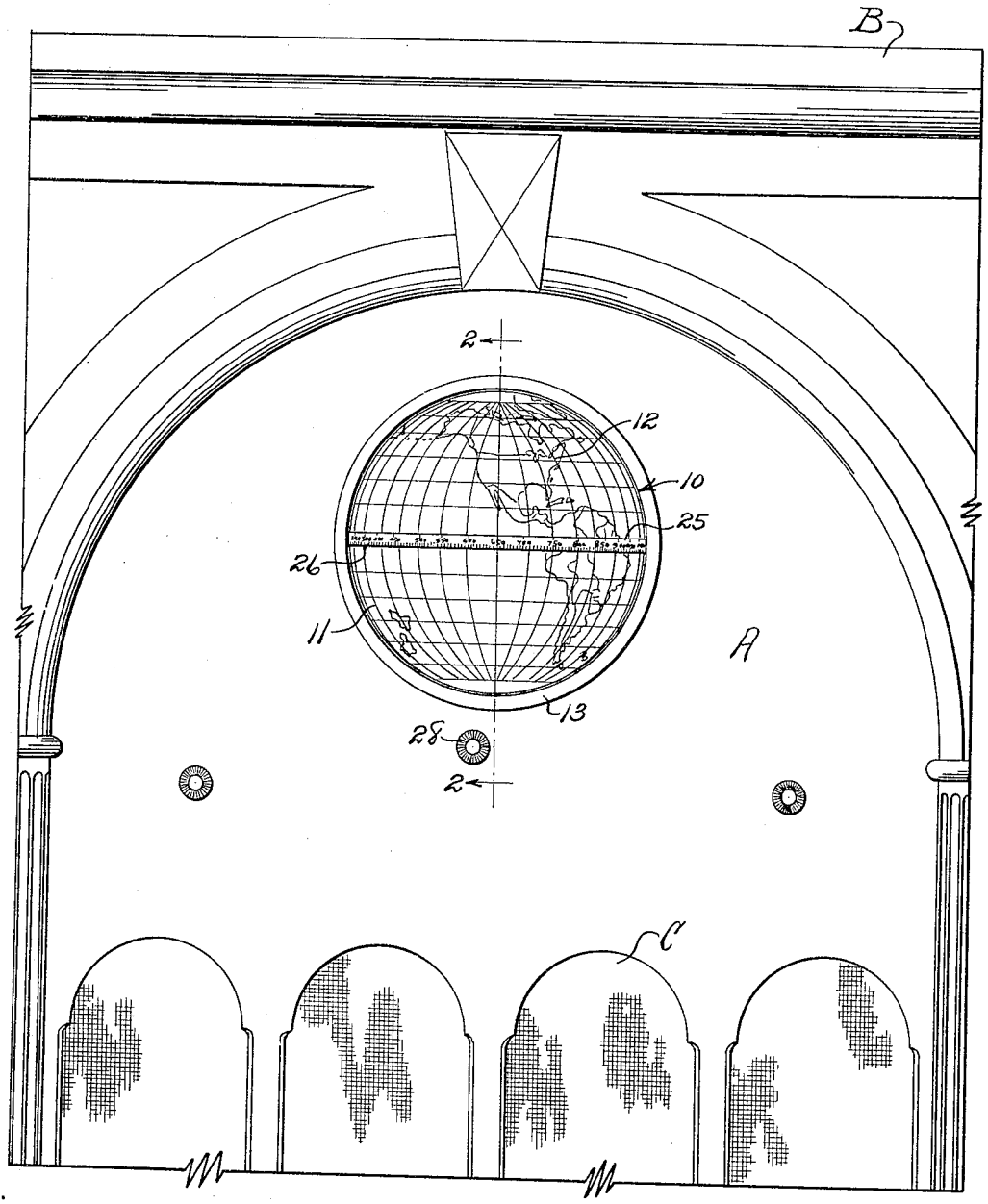
Figure 1 is a fragmentary front elevation of a radio receiving set with the dial or selector constructed in accordance with the invention associated therewith.

Referring to the drawings in detail, A designates generally the front panel in the cabinet B of a radio receiving set, this panel being provided with sound emitting slots or openings C for a loud speaker in association with the radio set.

The panel A, at a convenient point or location, has formed therein a circular opening 10 in which is arranged a sphere or globe formed with a hollow translucent body 11, preferably made in two sections and its outer surface is decorated or mapped indicative of the hemispheres of the world, as indicated at 12. Mounted on the inner side of the panel A immediately beneath the opening 10 therein is a suitable rim 13 for the opening 10 and the lowermost point of this rim is provided with a bearing 14 in which is arranged a vertical arbor or shaft 15, the bearing 14 being formed with a vertical upstanding axle 16 receiving thereon the hub 17 of a pinion or gear 18, the hub 17 being made fast to the sphere or globe to support the same properly within the opening 10.

Connected with the upper end of the axle 16 of the bearing 14 is a bracket 19 having an angularly disposed arm 20, the bracket and its arm being located interiorly of the sphere or globe and in the free end of said arm is journaled a rack gear or pinion 21, the stud 22 of which has connected thereto a flexible shaft 23, the latter being made fast to the shaft 15 so that motion imparted to the latter will be transmitted through the shaft 23 to the gear or pinion 21. At the transverse horizontal center of the sphere or globe is arranged interiorly thereof an annular toothed rack 24 with which meshes the gear or pinion 21 so that the said globe or sphere can be rotated on the vertical axle 16, as will be clearly obvious in Figure 2 of the drawings.

The rack 24 is fitted with an annular dial strip or band 25 located exteriorly of and encircling the sphere or globe horizontally of the same. This strip or band has on its outer face a scale or demarcations 26 representing a logging chart indicative of the meters or wave lengths of radio broadcasting.

Suitably mounted in the panel A beneath the opening 10, is a worm screw shaft 27 which projects exteriorly of the panel and is fitted with a hand knob 28, the worm screw 29 at the inner end of this shaft being in mesh with a worm gear 30 fixed to the lower end of the shaft 15 so that on the turning of the knob 28, adjustment of the globe or sphere can be had.

Arranged in a suitable support 31 interiorly of the radio set is a condenser operating shaft 32 fitted with a gear 33 meshing with the gear 17 so that motion imparted to the globe or sphere will be transmitted therefrom to the condenser of the radio receiving set for its adjustment.

On the bracket 19, interiorly of the sphere or globe, is arranged a forwardly and upwardly curved pointer 34 adapted to co-act with the scale strip band or logging chart 26 in a manner presently described.

The arm 20 of the bracket 19 is provided with a forwardly directed extension 35 in which is fitted an electric bulb 36 arranged in a suitable electric circuit in the equipment of the radio receiving set and includes the electric connection B leading outside of the globe or sphere to any desirable current supply and this bulb 36, when illuminated, casts a pronounced shadow of the pointer 34 on to the translucent sphere or globe so that the tip of said pointer will be effective to coincide with any one of the scale marks on the band or strip 26 when the sphere or globe has been adjusted and selective meters had according to the broadcasting logging chart.

It is, of course, to be understood that the sphere or globe may be otherwise arranged or mounted with relation to the panel A or the cabinet B of the radio receiving set and successfully operated, this being contemplated within the scope of the invention.

It is to be further understood that changes, variations and modifications may be made in the structure without departing from the spirit or sacrificing any of the advantages of the invention, as come properly within the scope of the appended claims.

What is claimed is:—

1. A station selector for a radio receiving set, comprising a spherical, hollow translucent body having a mapped external surface, a wave length scale externally encircling the body, means rotatably supporting the body, a pointer within the body and visible from without the same for cooperation with the scale and a shadow casting means for the body to effect thereon the shadow of the pointer.

2. A station selector for a radio receiving set, comprising a spherical, hollow translucent body having a mapped external surface, a wave length scale externally encircling the body, means rotatably supporting the body, a pointer within the body and visible from without the same for cooperation with the scale, and manually controlled mechanism for simultaneously adjusting a tuning element of the receiving set and the said body.

3. A station selector for a radio receiving set, comprising a spherical, hollow translucent body having a mapped external surface, a wave length scale externally encircling the body, means rotatably supporting the body, a pointer within the body and visible from without the same for cooperating with the scale, manually controlled mechanism for simultaneously adjusting a tuning element of the receiving set and the said body, and illuminating means within the said body and effective to cast prominently a shadow of the pointer thereon.

4. A station selector for a radio receiving set, comprising a spherical, hollow translucent body having a mapped external surface, a wave length scale externally encircling the body, means rotatably supporting the body, a pointer within the body and visible from without the same for cooperating with the scale, manually controlled mechanism for simultaneously adjusting a tuning element of the receiving set and the said body, illuminating means within the said body and effective to cast prominently a shadow of the pointer thereon, and means for operatively supporting the body and said control mechanism in association with the receiving set.

5. In a radio receiving set, a station selector, comprising a spherical body having an external mapped surface, means for rotatably mounting the body visibly within the receiving set, a hand operated knob arranged in said set, connections between the knob and a tuning element of the set and the said body for simultaneously operating the condenser and body, a logging chart externally on the body, and a pointer co-active with the chart.

6. In a radio receiving set, a station selector, comprising a spherical body having an external mapped surface, means for rotatably mounting the body visibly within the receiving set, a hand operated knob arranged in said set, connections between the knob and a tuning element of the set and the said body for simultaneously operating the condenser and body, a logging chart externally on the body, a pointer co-active with the chart, and means for illuminating the body interiorly thereof.

7. In a radio receiving set, a station selector, comprising a spherical body having an internal mapped surface, means for rotatably mounting the body visibly within the receiving set, a hand operated knob arranged in said set, connections between the knob and a tuning element of the set and the said body for simultaneously operating the tuning element and body, a logging chart externally on the body, a pointer co-active with the chart, the body being of translucent hollow formation and adapted to contain an illuminating element.

8. A station selector for a radio receiving set comprising a translucent body having a mapped external surface, a wave length scale externally of the body, and a pointer within the body and visible from without the same for cooperation with the scale and a shadow casting means for the body to effect thereon the shadow of the pointer.

9. A station selector for a radio receiving set comprising a translucent body having a mapped external surface, a wave length scale externally of the body, and a pointer adjacent the body and visible from without the same for cooperation with the scale.

In testimony whereof I affix my signature.

ALBERT L. C. RINGEL.